US012812677B2

(12) United States Patent
Desai et al.

(10) Patent No.: US 12,812,677 B2
(45) Date of Patent: Nov. 24, 2026

(54) DYNAMIC PUNCTURING ASSISTED RESILIENCY AGAINST SPORADIC INTERFERERS FOR MULTI-ACCESS POINT COORDINATION

(71) Applicant: Cisco Technology, Inc., San Jose, CA (US)

(72) Inventors: Vishal S. Desai, San Jose, CA (US); Santosh B. Kulkarni, Sunnyvale, CA (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 18/303,286

(22) Filed: Apr. 19, 2023

(65) Prior Publication Data

US 2024/0357648 A1 Oct. 24, 2024

(51) Int. Cl.
*H04W 74/0816* (2024.01)

(52) U.S. Cl.
CPC .............................. *H04W 74/0816* (2013.01)

(58) Field of Classification Search
CPC ............ H04W 74/0816; H04W 72/27; H04W 72/541; H04L 5/0073
See application file for complete search history.

(56) References Cited

U.S. PATENT DOCUMENTS 6,799,044 B1 * 9/2004 Wesby .................. H04W 16/10 455/63.1
2006/0182064 A1 * 8/2006 Durand ................. H04W 24/02 370/332
2013/0265968 A1 * 10/2013 Palanki ................. H04W 72/21 370/329
2016/0262163 A1 * 9/2016 Gonzalez Garrido ....................... H04W 16/10
2018/0167949 A1 6/2018 Del Carpio Vega et al.
2019/0007973 A1 * 1/2019 Lou ..................... H04W 74/006
2019/0261369 A1 * 8/2019 Verma ................... H04L 5/0048
2020/0076519 A1 * 3/2020 Asterjadhi ............ H04L 1/0027
2020/0084759 A1 * 3/2020 Liu ....................... H04L 1/1671
2020/0396621 A1 * 12/2020 Park ..................... H04B 7/0695
2021/0168642 A1 * 6/2021 Kimba Dit Adamou .................... H04W 24/10
2021/0392655 A1 * 12/2021 Wilhelmsson ........ H04L 1/1861
2022/0085910 A1 * 3/2022 Sun .................. H04W 74/0816
(Continued)

FOREIGN PATENT DOCUMENTS

WO 2022226298 A1 10/2022

OTHER PUBLICATIONS

International Search Report and Written Opinion for International Application No. PCT/US2024/024659, mailed Jul. 30, 2024, 13 Pages.

*Primary Examiner* — Nizar N Sivji
(74) *Attorney, Agent, or Firm* — Patterson + Sheridan, LLP

(57) ABSTRACT

Systems and techniques for mitigating interference in multi-access point coordination (MAPC) deployments are described. An example technique includes obtaining interference information associated with at least one device interfering with multi-access point communication. The interference information includes at least one of an indication of a frequency of occurrence of interference with the multi-access point communication or an indication of a duration of the interference. Resource allocation is performed for the multi-access point communication, based on the interference information.

17 Claims, 6 Drawing Sheets

(56) References Cited

U.S. PATENT DOCUMENTS

| | | | | |
|---|---|---|---|---|
| 2022/0116997 | A1* | 4/2022 | Handte | H04W 74/0816 |
| 2022/0295490 | A1* | 9/2022 | Erceg | H04W 72/541 |
| 2024/0056827 | A1* | 2/2024 | Elazzouni | H04W 76/28 |
| 2024/0137980 | A1* | 4/2024 | Ajami | H04W 24/10 |
| 2024/0314682 | A1* | 9/2024 | Nayak | H04W 48/20 |
| 2025/0039915 | A1* | 1/2025 | Lou | H04W 72/542 |
| 2025/0063597 | A1* | 2/2025 | Ambede | H04B 17/318 |

* cited by examiner

DYNAMIC PUNCTURING ASSISTED RESILIENCY AGAINST SPORADIC INTERFERERS FOR MULTI-ACCESS POINT COORDINATION

TECHNICAL FIELD

Embodiments presented in this disclosure generally relate to wireless communications. More specifically, embodiments disclosed herein relate to techniques for mitigating interference in multi-access point coordination deployments in wireless systems.

BACKGROUND

Wireless communication standards, such as the Institute of Electrical and Electronics Engineers (IEEE) 802.11 technical standard, are continuing to evolve to meet the ever increasing demands of bandwidth intensive and low latency services, such as augmented/extended reality and cloud gaming. For example, recent amendments to IEEE 802.11 (e.g., IEEE 802.11be amendment) aim to introduce higher data rates using higher modulation orders, larger channel widths, and additional spatial streams, as well as a set of new features such as multi-link operation (MLO) and multi access point coordination (MAPC).

MLO enables devices, such as access points (APs) and client stations (STAs), to simultaneously send and receive data across different frequency bands and channels. With MLO, multiple links can be established between the STA and AP to increase throughput, reduce latency, and improve reliability. MAPC allows an AP that wins contention to share its transmit opportunity (TXOP) with its peer APs and also allows the contention-winning AP to coordinate the available temporal, frequency, and spatial resources for the peer APs, improving the wireless performance in terms of throughput and latency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
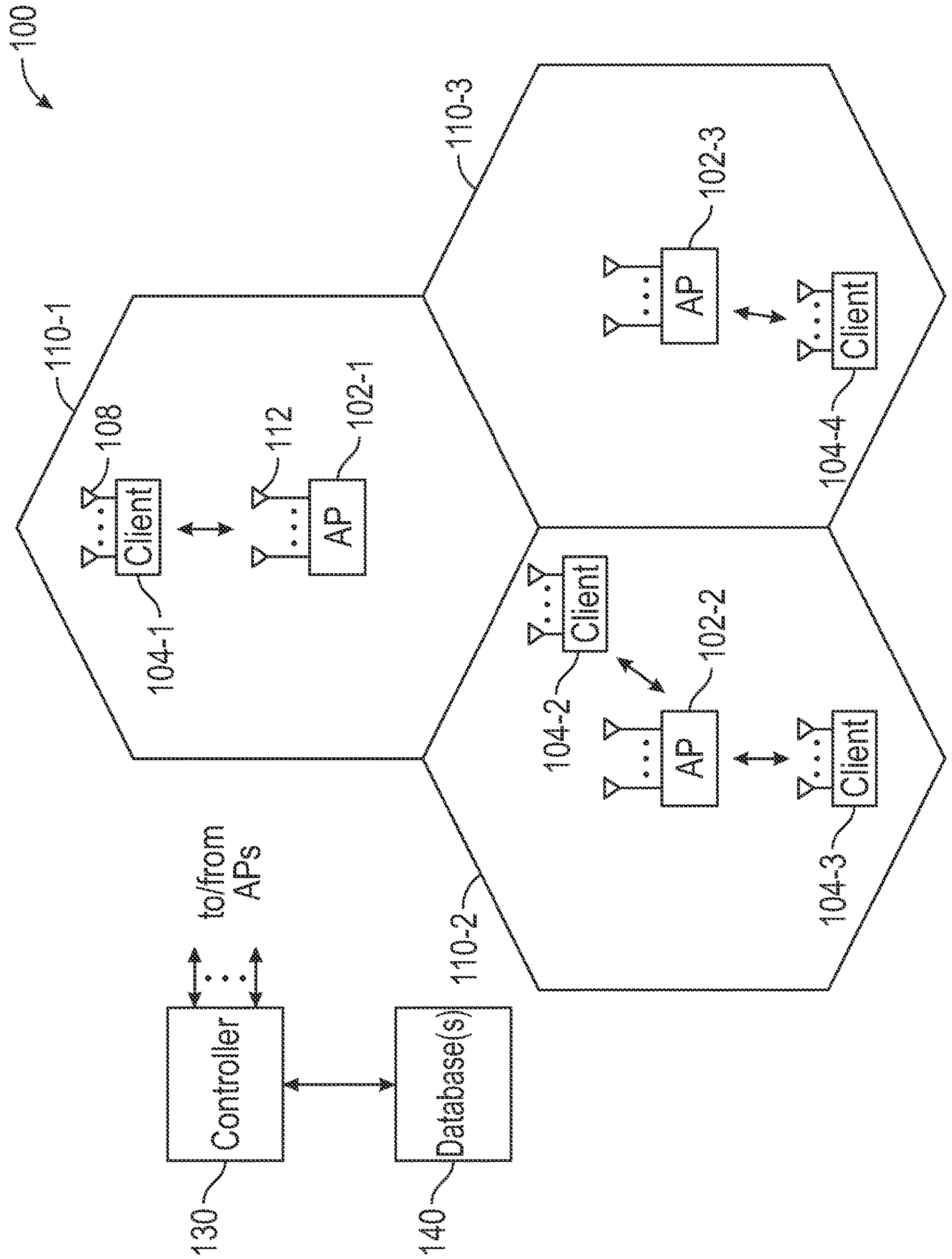
FIG. 1 illustrates an example system, according to one embodiment.

One embodiment described herein is a computer-implemented method. The computer-implemented method includes obtaining interference information associated with at least one device interfering with multi-access point communication. The interference information includes at least one of an indication of a frequency of occurrence of interference with the multi-access point communication or an indication of a duration of the interference. The computer-implemented method also includes performing resource allocation for the multi-access point communication, based on the interference information.

Another embodiment described herein is a system. The system includes a method and a processor communicatively coupled to the memory. The processor is configured to perform an operation. The operation includes obtaining interference information associated with at least one device interfering with multi-access point communication. The interference information includes at least one of an indication of a frequency of occurrence of interference with the multi-access point communication or an indication of a duration of the interference. The operation also includes performing resource allocation for the multi-access point communication, based on the interference information.

Another embodiment described herein is a computer-readable storage medium. The computer-readable storage medium includes computer executable code, which when executed by one or more processors, performs an operation. The operation includes obtaining interference information associated with at least one device interfering with multi-access point communication. The interference information includes at least one of an indication of a frequency of occurrence of interference with the multi-access point communication or an indication of a duration of the interference. The operation also includes performing resource allocation for the multi-access point communication, based on the interference information.

Example Embodiments

Certain wireless systems (e.g., IEEE 802.11be and later) may support multi-access point coordination (MAPC) to maximize channel reuse and provide ultra-high reliability (UHR) to client STAs in the wireless system. In order to support UHR, a set of APs in a MAPC group can benefit from coordinated orthogonal frequency division multiple access (OFDMA) to maximize station performance within allocated resource units (RUs). To support this function, the APs in the MAPC group may use a higher bandwidth allocation for improved capacity within the MAPC group.

However, with a higher amount of spectrum supported across a set of APs, the set of APs in a MAPC group may be more susceptible to interference from one or more interferer devices and incumbent devices, compared to legacy wireless systems. Additionally, in some cases, mobile interferer devices and incumbent devices can impact the channel access for the set of APs for short durations with high intensity. Such sporadic interferers can jeopardize wireless operations in high density environments, such as enterprise, education, warehouses, etc.

Further, in scenarios where the set of APs are subject to sporadic, high intensity interference, conventional contention-based channel avoidance techniques can have a detrimental impact on the set of APs, especially in MAPC use cases where a wider bandwidth is allocated and shared among APs in the MAPC group. Accordingly, it may be desirable to provide improved techniques for mitigating interference in MAPC deployments.

Embodiments described herein provide systems, devices, and techniques for mitigating interference in MAPC deployments. As described herein, embodiments provide techniques for classifying interferers based on their duration on one or more channels of a shared bandwidth. Embodiments further provide techniques for optimizing allocation of RUs within a MAPC group using static and dynamic puncturing techniques. In this manner, embodiments can significantly reduce interference in MAPC deployments, compared to conventional contention-based channel avoidance techniques.

Note, the techniques described herein for mitigating interference in MAPC deployments may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include an AP or a controller.

FIG. 1 illustrates an example system 100 in which one or more techniques described herein can be implemented, according to one embodiment. As shown, the system 100 includes one or more APs (e.g., AP 102-1, AP 102-2, and AP 102-3), one or more client STAs (e.g., client STA 104-1, client STA 104-2, client STA 104-3, and client STA 104-4), a controller 130, and one or more databases 140. An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 is the serving AP for client STA 104-1, AP 102-2 is the serving AP for client STAs 104-2 and 104-3, and AP 102-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links with an AP 102. As also shown, each AP 102 includes one or more radios 112 that the AP 102 can use to form links with one or more client STAs 104. In general, the AP(s) 102 and the client STA(s) 104 may form any suitable number of links for communication using any suitable frequencies. In some instances, a client STA 104 may form multiple links with a single AP 102. Example hardware that may be included in an AP 102 and a client STA 104 is discussed in greater detail in regard to FIG. 6.

The controller 130 couples to and provides coordination and control for the APs 102 1-3. For example, the controller 130 may handle adjustments to RF power, channels, authentication, and security for the APs. The controller 130 may also coordinate the links formed by the client STA(s) 104 with the APs 102. In certain embodiments described herein, the controller 130 can classify different types of interferer devices that can impact wireless communication of the MAPC group and transmit the classification information to the APs 102 in the MAPC group. As shown, the controller 130 may be communicatively coupled to (or integrated with) one or more databases 140. The database(s) 140 are representative of storage systems that may include information on one or more channels of an operating bandwidth shared by one or more APs. For example, at least one database 140 may include or store (i) radio resource management (RRM) information, (ii) logic (e.g., artificial intelligence (AI), machine learning (ML) models, etc.) for analyzing wireless operating parameters, such as duration of interference, type of interferer device, strength of interference, and other parameters, or (iii) a combination thereof.

In certain embodiments, the controller 130 is included within or integrated with an AP 102 and coordinates the links formed by that AP 102 (or otherwise provides control for that AP). For example, each AP 102 may include a controller that provides control for that AP. In certain embodiments, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in a controller 130 is discussed in greater detail with regard to FIG. 6.

In certain embodiments, one or more of the APs 102 may participate in TXOP sharing, e.g., as part of MAPC, where the APs utilize coordinated OFDMA to improve station performance. To support TXOP sharing between APs 102, one of the APs 102 (e.g., AP 102-1) may act as the initiator and coordinate a shared transmission, while the other APs (e.g., APs 102-2 and 102-3) may follow the shared schedule. The AP initiating the shared transmission may be referred to as the "sharing AP," while the rest of the APs 102 may be referred to as the "shared APs." In one embodiment, the sharing AP is the AP that wins contention to the shared medium among the other APs. When the APs 102 form a coordination group, the sharing AP can distribute the time it has in its winning TXOP with the other APs 102 in the group.

Figure 2:
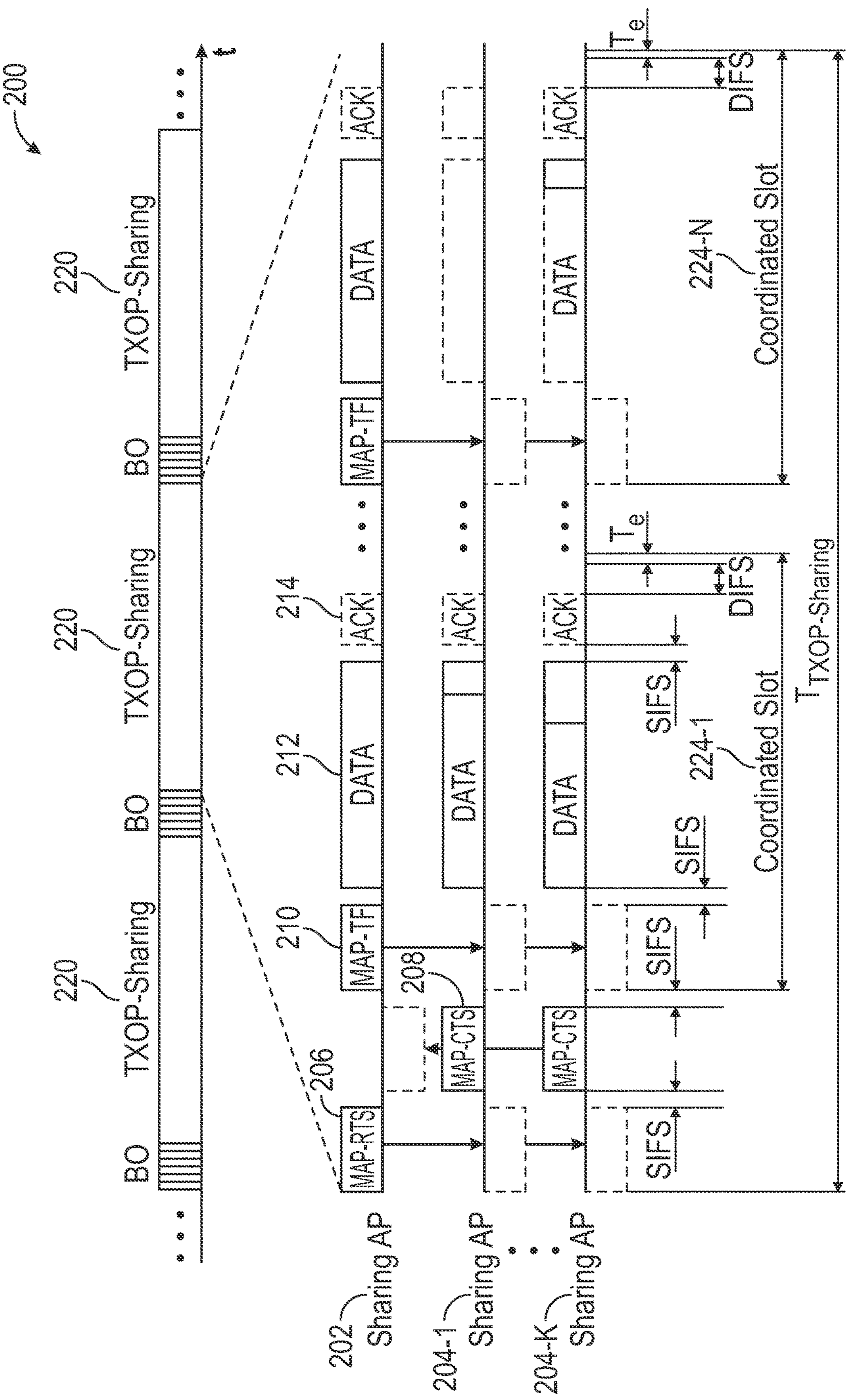
FIG. 2 illustrates an example TXOP sharing scheme, according to one embodiment.

FIG. 2 illustrates an example coordinated time division multiple access (cTDMA) and coordinated spatial reuse (c-SR) mechanism 200, which are example, non-limiting, TXOP sharing implementations. In FIG. 2, the sharing AP 202 and shared APs 204 1-K form a coordination group. The sharing AP 202 and the shared APs 204 are reference examples of the APs 102 depicted in FIG. 1. Here, a coordinated transmission (e.g., TXOP-sharing 220) starts with the sharing AP 202 sending a multi-access point (MAP) request-to-send (RTS) (MAP-RTS) frame 206. If there is no collision, the shared APs 204 reply at the same time with a MAP clear-to-send (CTS) (MAP-CTS) frame 208. At this point, the sharing AP 202 may assume that all devices in the network have properly set their network allocation vector (NAV), such that the multi-AP transmission will not be disturbed until it ends. After this setup, the sharing AP 202 may grant temporal or coordinated slots 224 to one or more of the shared APs 204 1-K in the coordination group.

To grant a coordinated slot 224, the sharing AP 202 sends a MAP trigger frame (MAP-TF) 210 to allocate the next coordinated slot (e.g., coordinated slot 224-1) to one or more shared APs 204. The MAP-TF 210 includes a set of configuration parameters, such as maximum physical layer convergence procedure (PLCP) protocol data unit (PPDU) length, coordinated slot duration, total bandwidth, modulation and coding scheme (MCS), and transmission power, for the shared APs 204 to use in their upcoming transmission 212 (e.g., PPDU) to their respective client STAs 104. Each respective transmission 212 (e.g., PPDU) by an AP in a coordinated slot 224 may occupy different (sub)-channels (or a set of RUs) of a shared bandwidth among the APs (e.g., using coordinated OFDMA). The sharing AP 202 and shared APs 204 may then receive acknowledgments (ACKs) 214 from their respective client STAs 104.

As noted, in certain scenarios, sporadic interferers can significantly impact channel reuse opportunities in high density environments with traditional interference management techniques, such as conventional contention-based channel avoidance techniques. The interference impact may be magnified in multi-AP operation (e.g., MAPC, such as the TXOP sharing implementation depicted in FIG. 2) since a wider pool of bandwidth (e.g., shared RUs) is shared between multiple radio resources within a localized radio frequency (RF) neighborhood.

To address this, embodiments herein provide techniques for classifying interferer duration and taking appropriate remediation for a MAPC. Rather than utilizing conventional channel switching techniques to reduce interference from interferer devices, embodiments described herein provide techniques for using different levels of puncturing, based on the interferer duration, in order to reduce interference to MAPC operation. More specifically, embodiments provide a two-step method, which involves (i) conducting interferer classification, based on its duration on the shared RUs among the MAPC group and (ii) optimizing RU allocation within a MAPC group, leveraging dynamic or static puncturing techniques, based on the interferer classification.

Figure 3:
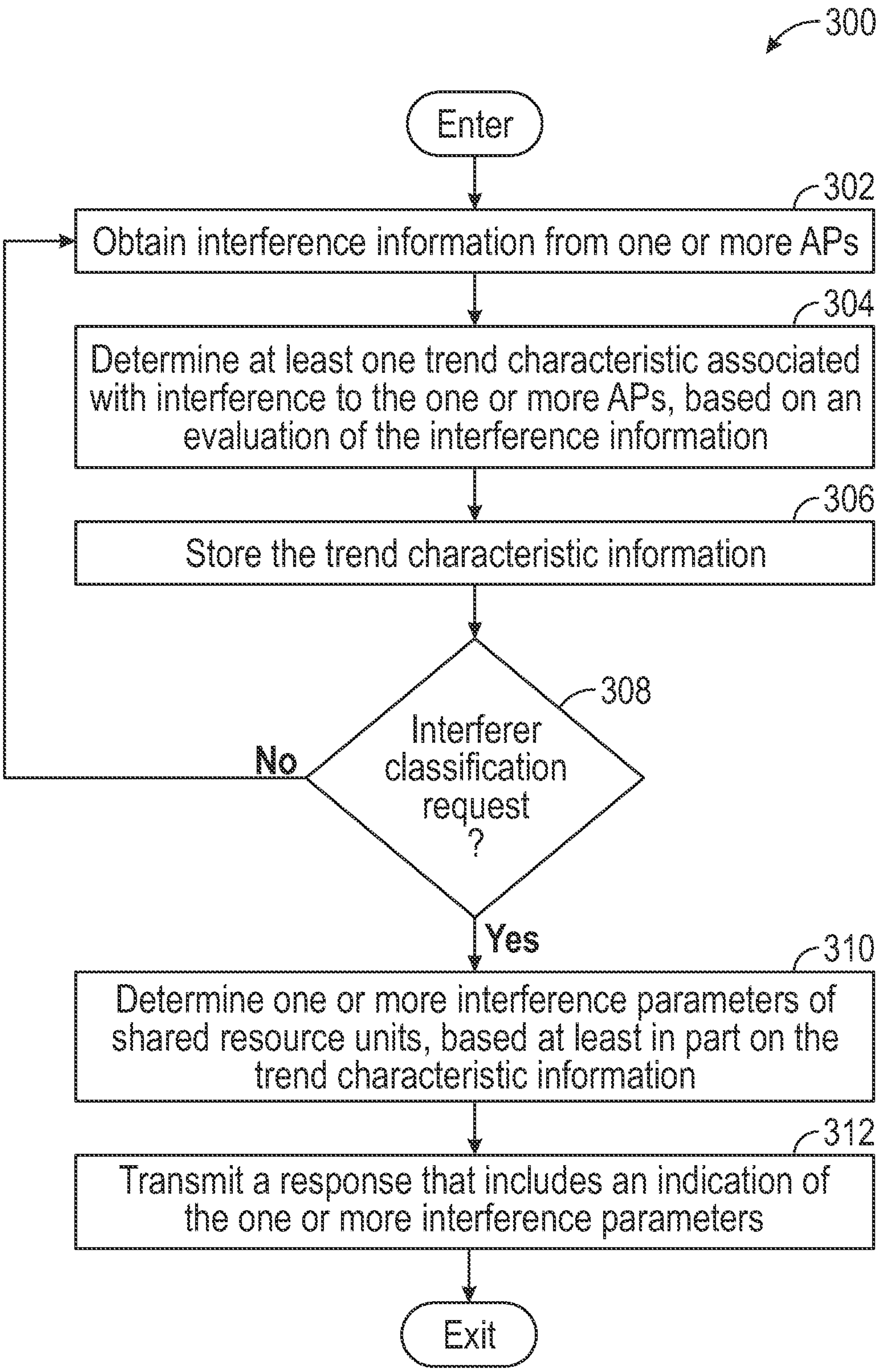
FIG. 3 is a flowchart of a method for mitigating interference in MAPC deployments, according to one embodiment.

FIG. 3 is a flowchart of a method 300 for mitigating interference in MAPC deployments, according to one embodiment. The method 300 may be performed by a controller (e.g., controller 130).

Method 300 enters at block 302, where the controller obtains interference information from one or more APs (e.g., APs 102). The one or more APs may form a MAPC group. For example, the one or more APs may include a sharing AP (e.g., sharing AP 202) and one or more shared APs (e.g., shared APs 204 1-K). In certain embodiments, the controller may obtain the interference information from the one or more APs over a period of time (e.g., as the AP(s) report the interference information to the controller). In certain embodiments, the controller may obtain the interference information from a sharing AP among the one or more APs. In such embodiments, the sharing AP may periodically collect interference statistics and signature(s) from the shared APs and report the information to the controller.

The interference information may include interference statistics (or parameters), such as timestamp(s), interference signal(s) (e.g., Bluetooth signals, cellular signals, 802.11 signals, microwaves, and other signals), duty cycle, duration, media access control (MAC) address (e.g., for 802.11 or WiFi interferers), pseudo-MAC address (e.g., for non-WiFi interferers), and other parameters. Note, in certain embodiments, in addition to or, as an alternative to, obtaining the interference information from the one or more APs, the controller may obtain at least some interference information from another system/database (e.g., database 140) communicatively coupled to the controller.

At block 304, the controller determines at least one trend characteristic associated with interference to the one or more APs, based on an evaluation of the interference information. The controller can evaluate the interference information to isolate infrequent and sporadic interferers, such as Bluetooth, unlicensed new-radio (NR-U) signals, and microwaves from persistent interferers, such as rogue APs and 802.11 jammers. Thus, the at least one trend characteristic may include at least one of (i) an indication of a frequency of occurrence of the interference (e.g., whether the interference is infrequent or reoccurring), (ii) an indication of a duration of the interference (e.g., whether the interference is short duration or persistent), or (iii) a strength of the interference.

In certain embodiments, the controller uses an AI/ML model to evaluate the interference information at block 304. For example, such an AI/ML model may be trained to output the at least one trend characteristic, based on the interference information. In certain embodiments, the AI/ML may be trained and/or updated based on the interference information. At block 306, the controller stores the trend characteristic information along with the AI/ML model, e.g., in a storage system, such as database 140.

At block 308, the controller determines whether an interference classification request has been received from an AP (e.g., sharing AP 202). For example, the AP may transmit the interference classification request to obtain information regarding interference on one or more RUs being shared among a set of APs in a MAPC group. The interference classification request may include an indication of the shared RUs (e.g., (sub)-channels of a shared bandwidth). If an interference classification request has not been received, the method 300 returns to block 302. On the other hand, if the interference classification request has been received, then the method 300 proceeds to block 310.

At block 310, the controller determines one or more interference parameters of the shared RUs (indicated in the interference classification request), based at least in part on the trend characteristic information. The one or more interference parameters may include at least one of (i) a type of interferer operating on the shared RUs, (ii) a duration of the inference from the interferer (e.g., the transmit duration), or (iii) an indication of whether the interference is infrequency or repetitive. At block 312, the controller transmits a response to the AP (e.g., sharing AP 202) that includes an indication of the one or more interference parameters. Method 300 may then exit.

Figure 4:
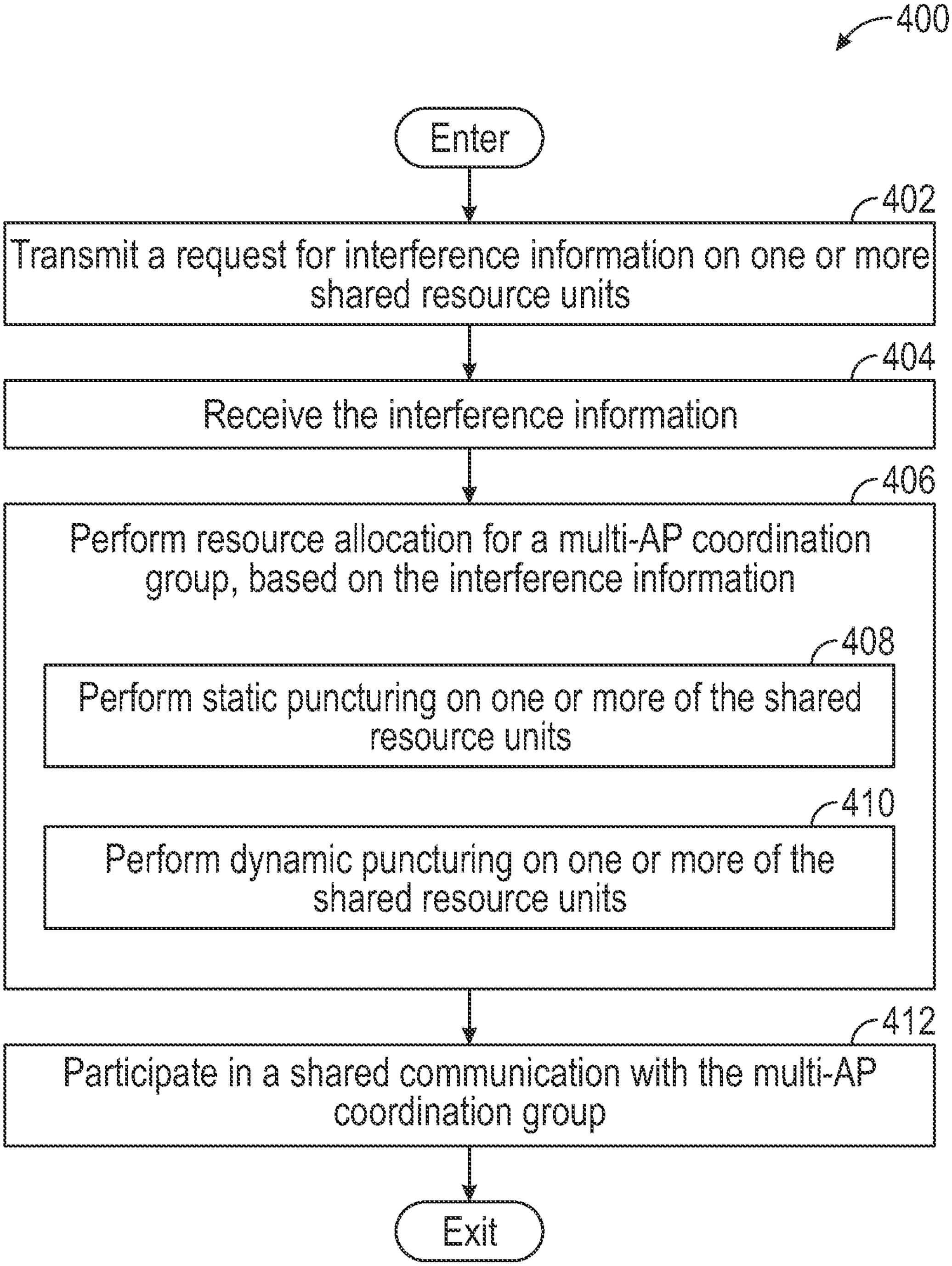
FIG. 4 is a flowchart of another method for mitigating interference in MAPC deployments, according to one embodiment.

FIG. 4 is a flowchart of another method 400 for mitigating interference in MAPC deployments, according to one embodiment. The method 400 may be performed by an AP (e.g., AP 102). In a particular embodiment, the method 400 is performed by a sharing AP (e.g., sharing AP 202).

Method 400 enters at block 402, where the sharing AP transmits a request for interference information on one or more shared RUs. For example, the sharing AP may transmit the request prior to allocating RUs to one or more shared APs for a MAPC communication. The request may include an indication of the shared RUs. As shown in the example scenario 500 illustrated in FIG. 5, the sharing AP 202 may transmit a request 502 querying the AI-RRM component 510 of a controller (e.g., controller 130) for interference information on one or more shared channels (e.g., shared RUs) among the MAPC group (e.g., sharing AP 202 and shared APs 204 1-4). In one embodiment, the AI-RRM component 510 includes an incumbent classifier 540, which is representative of a database (e.g., database 140) that includes trend characteristic information and/or an AI/ML model configured to output interference information.

Figure 5:
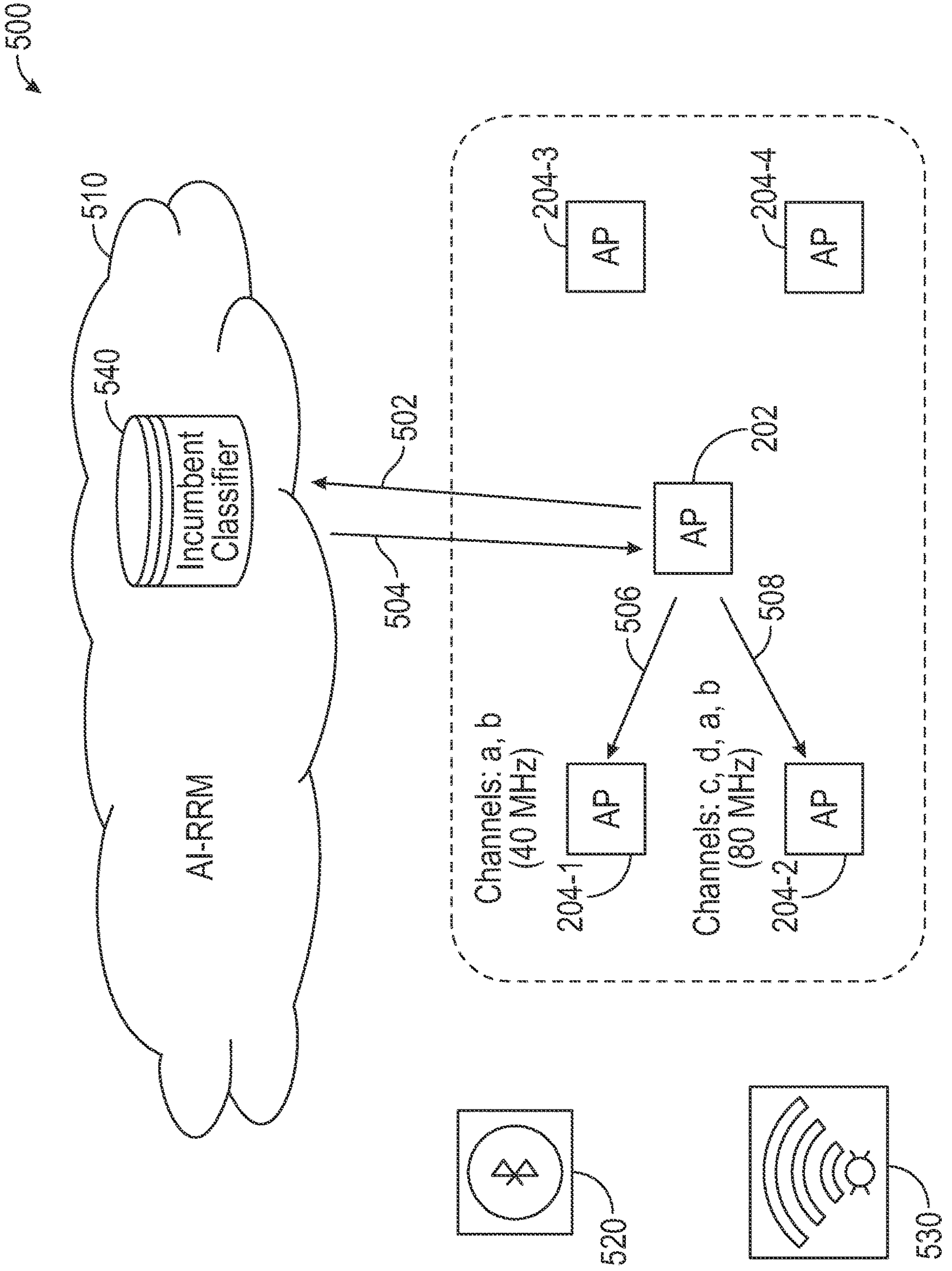
FIG. 5 illustrates an example scenario for mitigating interference in MAPC deployments, according to one embodiment.

Referring back to FIG. 4, at block 404, the sharing AP receives the interference information. The interference information may include at least one of (i) an indication of a type of interferer operating on (or impacting) the shared RUs, (ii) a duration of the interference, or (iii) an indication of whether the interference is infrequent or repetitive. As shown in FIG. 5, for example, the AI-RRM component 510 transmits a response 504 that includes incumbent trends for the shared RUs.

Referring back to FIG. 4, at block 406, the sharing AP performs resource allocation for a MAPC group, based on the interference information. For example, the sharing AP may optimize the allocation of shared RUs among the MAPC group, based on the interference information, for instantaneous interference management within the MAPC group. Block 406 may include (sub)-blocks 408, 410, or a combination thereof.

At (sub)-block 408, the sharing AP performs static puncturing on one or more of the shared RUs. For example, in the interference information indicates that the interferer is persistent and/or has a long duration (e.g., greater than a predefined amount of time), then static puncturing may be performed on the RUs for a predefined amount of time (e.g., for the next RRM cycle). In another example, if the interference information indicates that the interference is persistent and/or has a long duration, then one or more of the RUs may be relocated to another shared radio resource (e.g., assuming the interferer is localized to a particular set of radio resources). In the example depicted in FIG. 5, for the persistent interferer 530, the sharing AP performs static puncturing on a set of RUs allocated to shared AP 204-2. In particular, the sharing AP punctures channel d of channels c, d, a, and b for a predetermined amount of time.

At (sub)-block 410, the sharing AP performs dynamic puncturing on one or more of the shared RUs. For example, if the interference information indicates that (i) the interferer is infrequent with short duration and (ii) the interferer operates adjacent to RUs of a shared (or sharing) AP, then dynamic puncturing may be conducted for the next predefined number of PPDUs, based on the duration of that interferer on the impacted set of frequencies. In the example depicted in FIG. 5, for the sporadic interferer 520, the sharing AP performs dynamic puncturing on a set of RUs allocated to shared AP 204-1. In particular, the sharing AP punctures x PPDUs on channel b. At block 412, the sharing AP participate in a shared communication with the MAPC group. Method 400 may then exit.

Figure 6:
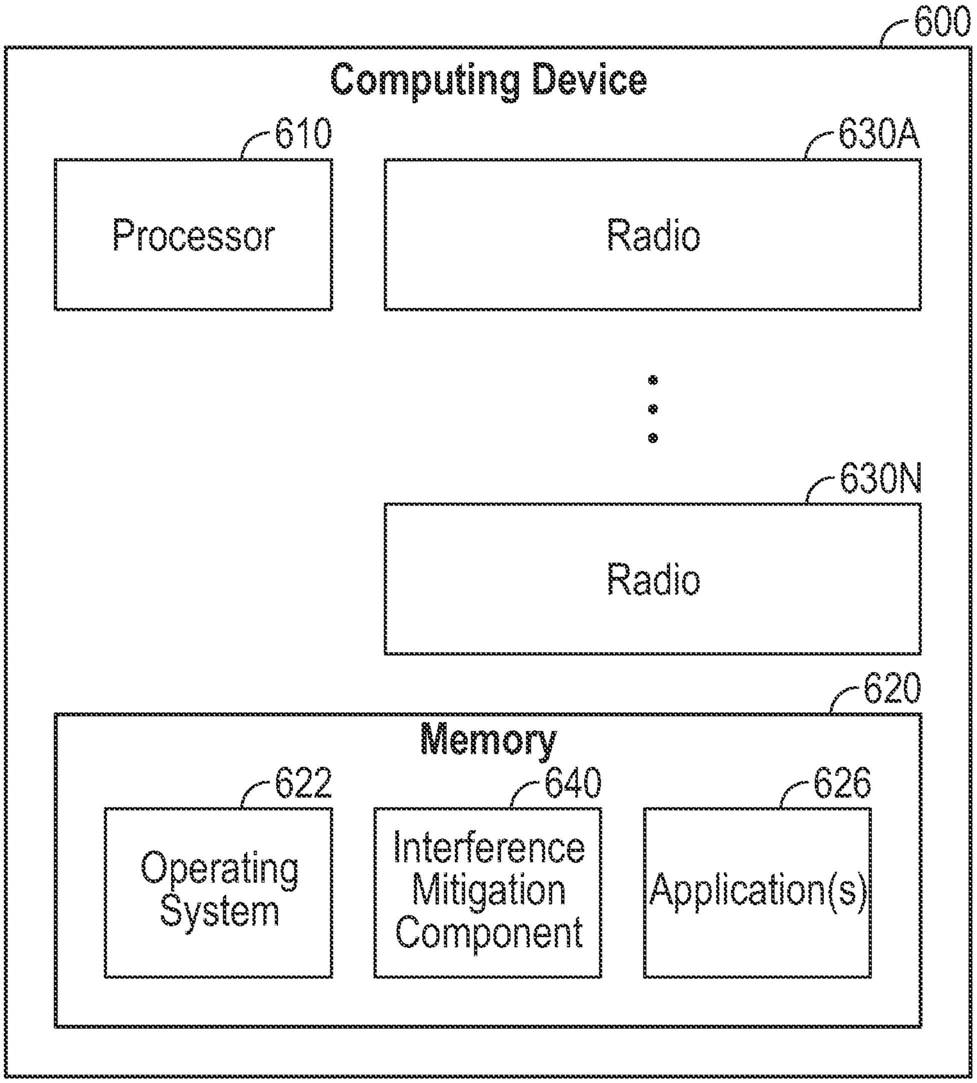
FIG. 6 illustrates an example computing device, according to one embodiment.

FIG. 6 illustrates an example computing device 600, according to one embodiment. The computing device 600 can be configured to perform one or more techniques described herein for mitigating interference in MAPC deployments. For example, the computing device 600 can perform method 300, method 400, and any other techniques (or combination of techniques) described herein. The computing device 600 can be an AP (e.g., AP 102) or a controller (e.g., controller 130). The computing device 600 includes a processor 610, a memory 620, and one or more radios 630*a-n* (generally, radio 630).

The processor 610 may be any processing element capable of performing the functions described herein. The processor 610 represents a single processor, multiple processors, a processor with multiple cores, and combinations thereof. The radios 630 facilitate communications between the computing device 600 and other devices. The radios 630 are representative of communication interferences, such as wireless communications antennas and various wired communication ports. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 622 to manage various functions of the computing device 600. The memory 620 also includes an interference mitigation component 640 configured to perform one or more techniques described herein, and one or more application(s) 626.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:

obtaining interference information associated with at least one device interfering with multi-access point (AP) communication, wherein the interference information comprises at least one of an indication of a frequency of occurrence of interference with the multi-AP communication or an indication of a duration of the interference with the multi-AP communication;

performing resource allocation for the multi-AP communication, based on the interference information, wherein performing the resource allocation comprises:

dynamically puncturing one or more resource units (RUs) being used for the multi-AP communication when at least one of the frequency of occurrence of the interference is below a first threshold or the duration of the interference is below a second threshold; and statically puncturing the one or more RUs when at least one of the frequency of occurrence of the interference is above the first threshold or the duration of the interference is above the second threshold; and participating, based on the resource allocation, in the multi-AP communication with a multi-AP coordination group.

2. The computer-implemented method of claim 1, further comprising transmitting a request for the interference information, wherein the interference information is obtained in response to the request.

3. The computer-implemented method of claim 1, further comprising:

receiving one or more interference parameters from one or more shared APs of the multi-AP coordination group; and transmitting the one or more interference parameters to a controller.

4. The computer-implemented method of claim 1, wherein the one or more RUs are statically punctured for a predetermined period of time.

5. The computer-implemented method of claim 1, wherein performing the resource allocation further comprises reallocating one or more RUs being used for the multi-AP communication.

6. The computer-implemented method of claim 5, wherein the one or more RUs are reallocated when at least one of the frequency of occurrence of the interference is above the first threshold or the duration of the interference is above the second threshold.

7. A system comprising a memory; and a processor communicatively coupled to the memory, the processor being configured to perform an operation comprising:

obtaining interference information associated with at least one device interfering with multi-access point (AP) communication, wherein the interference information comprises at least one of an indication of a frequency of occurrence of interference with the multi-AP communication or an indication of a duration of the interference with the multi-AP communication;

performing resource allocation for the multi-AP communication, based on the interference information, wherein performing the resource allocation comprises:

dynamically puncturing one or more resource units (RUs) being used for the multi-AP communication when at least one of the frequency of occurrence of the interference is below a first threshold or the duration of the interference is below a second threshold; and statically puncturing the one or more RUs when at least one of the frequency of occurrence of the interference is above the first threshold or the duration of the interference is above the second threshold; and participating, based on the resource allocation, in the multi-AP communication with a multi-AP coordination group.

8. The system of claim 7, the operation further comprising transmitting a request for the interference information, wherein the interference information is obtained in response to the request.

9. The system of claim 7, wherein the one or more RUs are statically punctured for a predetermined period of time.

10. The system of claim 7, wherein performing the resource allocation further comprises reallocating one or more RUs being used for the multi-AP communication.

11. The system of claim 10, wherein the one or more RUs are reallocated when at least one of the frequency of occurrence of the interference is above the first threshold or the duration of the interference is above the second threshold.

12. A non-transitory computer-readable storage medium comprising computer executable code, which when executed by one or more processors, performs an operation comprising:

obtaining interference information associated with at least one device interfering with multi-access point (AP) communication, wherein the interference information comprises at least one of an indication of a frequency of occurrence of interference with the multi-AP communication or an indication of a duration of the interference with the multi-AP communication;

performing resource allocation for the multi-AP communication, based on the interference information, wherein performing the resource allocation comprises:

dynamically puncturing one or more resource units (RUs) being used for the multi-AP communication when at least one of the frequency of occurrence of the interference is below a first threshold or the duration of the interference is below a second threshold; and statically puncturing the one or more RUs when at least one of the frequency of occurrence of the interference is above the first threshold or the duration of the interference is above the second threshold; and participating, based on the resource allocation, in the multi-AP communication with a multi-AP coordination group.

13. The non-transitory computer-readable storage medium of claim 12, the operation further comprising transmitting a request for the interference information, wherein the interference information is obtained in response to the request.

14. The non-transitory computer-readable storage medium of claim 12, the operation further comprising:

receiving one or more interference parameters from one or more shared APs of the multi-AP coordination group; and transmitting the one or more interference parameters to a controller.

15. The non-transitory computer-readable storage medium of claim 12, wherein the one or more RUs are statically punctured for a predetermined period of time.

16. The non-transitory computer-readable storage medium of claim 12, wherein performing the resource allocation further comprises reallocating one or more RUs being used for the multi-AP communication.

17. The non-transitory computer-readable storage medium of claim 16, wherein the one or more RUs are reallocated when at least one of the frequency of occurrence of the interference is above the first threshold or the duration of the interference is above the second threshold.

* * * * *